(12) United States Patent  
Aoki

(10) Patent No.: US 8,094,061 B2  
(45) Date of Patent: Jan. 10, 2012

(54) MULTIBAND TRANSCEIVER AND POSITIONING SYSTEM USING THE TRANSCEIVER

(75) Inventor: Yuuichi Aoki, Tokyo (JP)

(73) Assignee: NEC Corporation, Tokyo (JP)

( * ) Notice: Subject to any disclaimer, the term of this patent is extended or adjusted under 35 U.S.C. 154(b) by 53 days.

(21) Appl. No.: 12/526,356

(22) PCT Filed: Feb. 14, 2008

(86) PCT No.: PCT/JP2008/052428  
§ 371 (c)(1),  
(2), (4) Date: Aug. 7, 2009

(87) PCT Pub. No.: WO2008/102686  
PCT Pub. Date: Aug. 28, 2008

(65) Prior Publication Data  
US 2010/0321245 A1    Dec. 23, 2010

(30) Foreign Application Priority Data  
Feb. 22, 2007    (JP) ................................. 2007-042147

(51) Int. Cl.  
*G01S 13/08* (2006.01)
(52) U.S. Cl. .......................................... 342/127; 342/42
(58) Field of Classification Search ............... 342/42–51  
See application file for complete search history.

(56) References Cited

U.S. PATENT DOCUMENTS 6,078,786 A * 6/2000 Wandernoth et al. ........ 455/13.2

FOREIGN PATENT DOCUMENTS

| JP | 5-273350 A | 10/1993 |
| JP | 2623931 B | 4/1997 |
| JP | 11-178038 A | 7/1999 |
| JP | 11-252631 A | 9/1999 |
| JP | 3158438 B | 2/2001 |
| JP | 2001051044 A | 2/2001 |
| JP | 2002040120 A | 2/2002 |
| JP | 2005252631 A | 9/2005 |
| JP | 2006042201 A | 2/2006 |
| JP | 2006208355 A | 8/2006 |

OTHER PUBLICATIONS

International Search Report for PCT/JP2008/052428 mailed Mar. 18, 2008.

* cited by examiner

*Primary Examiner* — Timothy A Brainard

(57) ABSTRACT

The present invention comprising: a first local oscillator for generating a first frequency; a second local oscillator for generating a second frequency; phase-difference setting means for setting a first phase difference between a transmission signal and an output of the aforementioned first local oscillator; phase-difference detection means for detecting a second phase difference which is the phase difference between a reception signal and an output of the aforementioned second local oscillator, and calculation means for calculating a distance to a communication counterpart from a third phase difference and a fourth phase difference which are notified by the communication counterpart, and from the aforementioned first phase difference and second phase difference, wherein the third phase difference is set to the second frequency by the communication counterpart, and the fourth phase difference is set to the first frequency by the communication counterpart.

16 Claims, 7 Drawing Sheets

MULTIBAND TRANSCEIVER AND POSITIONING SYSTEM USING THE TRANSCEIVER

This application is the National Phase of PCT/JP2008/052428, filed Feb. 14, 2007, which is based upon and claims priority from Japanese Patent Application No. 2007-042147 filed on Feb. 22, 2007, which is incorporated herein in its entirety by reference.

TECHNICAL FIELD

The present invention relates to a multiband transceiver having a distance measurement function and a distance measurement system utilizing the transceiver.

BACKGROUND ART

So far, various positioning systems have been proposed. FIG. 1 shows a comparison of various kinds of positioning systems with the ordinate as positioning accuracy and the abscissa as the spacing between equipment required for positioning.

Positioning systems typified by GPS (Global Positioning System) perform time synchronization by using an accurate clock such as an atomic clock and measure the difference in arrival times of radio waves to realize positioning. Problems with a positioning system utilizing an atomic clock, such as GPS, include: high equipment cost due to the usage of an atomic clock: difficulty in underground usage because of the necessity of synchronization with the atomic clock on the satellite; large power consumption in high accuracy positioning and positioning without the aid of base stations; and others.

In positioning systems based on RFID (Radio-Frequency Identification) tags and PHS (Personal Handy-phone System), radio wave intensity is used for positioning. In such a technique, the position of a subject is determined assuming that the subject is present near one of the installed RFIDs and base stations from which the subject can receive the strongest radio wave. Moreover, an approximate distance is determined from the intensity of arriving radio wave. A problem of this technique is that since positioning accuracy becomes approximately the same as that of the base station installation spacing between the positioning equipment, many pieces of positioning equipment need to be provided thereby leading to high deployment cost.

In systems utilizing a wide bandwidth such as wireless LAN (Local Area Network) and UWB (Ultra-Wide Band), positioning is performed by comparing the difference in arrival time between the radio waves from a target radio station to be measured and a reference radio station. In this respect, wideband communication with sharp time changes is suitable for timing measurement. A problem with a positioning system utilizing a wide bandwidth is that a larger bandwidth generally results in larger reception power, and that since the accuracy is determined by the inverse of the bandwidth, use of wireless LAN does not provide enough bandwidth thereby resulting in poor accuracy.

Although impulse-UWB, whereby a high accuracy can be expected, can suppress transmission power to a very low level, it requires larger reception power and therefore is not suitable for systems which are driven by a battery for long hours. In order to cover such deficiency, a technique is envisioned in which a UWB for the transmission to a base station is combined with another technique for the reception from a base station. However, in a UWB which utilizes a wide bandwidth, power output needs to be suppressed to a low level to avoid interference with other radio waves, and therefore an arrival distance of about 10 m is assumed in UWB standards typified by IEEE 802.15.4a. Therefore, when only the communication from the target radio station for measurement to a base station is performed by UWB, the range within which positioning is possible becomes necessarily about 10 meters.

Besides the aforementioned positioning systems, there is a technique in which the difference in arrival time between a sound wave and a radio wave is used to perform distance measurement. Problems with this technique are that only sound waves may be interrupted, and that a microphone and a speaker are separately needed.

Other than those techniques shown in FIG. 1, there are a laser interferometer which utilizes a reflected wave to perform distance measurement in units of μm, and a radar which utilizes a reflected wave and a wide bandwidth to perform distance measurement. The problems with the use of reflected waves are that large power for transmission and high sensitivity for reception are required, and that since a circulator or the like is required to separate transmission and reception, the size of housing will become large.

Among those, a system which performs distance measurement without using an atomic clock, a base station synchronized with an atomic clock, a reflected wave, a sound wave, and a wideband communication is proposed in Patent Document 1 (Japanese Patent Laid-Open No. 11-178038).

FIG. 2 is a block diagram to show the configuration of the positioning-capable mobile communication system according to Patent Document 1.

An audible sound signal or data signal, which is a positioning signal, is transmitted from positioning signal originating section 811 of positioning apparatus 801 to the speech channel of mobile radio terminal apparatus 804. Next, the positioning signal transmitted from positioning apparatus 801 is turned back by turn-back means of speech section 843 of mobile radio terminal 804 and is returned to phase detection section 812 of aforementioned positioning apparatus 801. Eventually, phase detection section 812 compares the phases of the received turn-back signal and the source positioning signal of positioning signal originating section 811 to measure a delayed phase, and notifies the measurement result to calculation process section 814. Calculation process section 814 calculates a space propagation distance between radio base station 803 and mobile radio terminal apparatus 804 from the delayed phase.

Patent Document 1 neither specifically describes the turn-back means, nor the method of calculating distance from phase. Although the description is made assuming a PHS system, the space wavelength of the PHS frequency (1900 MHz band) is about 16 cm meaning that the same phase will be acquired for about every 8 cm even if turning back is performed by a certain technique, and therefore positioning cannot be practiced without specific description of the method of distance calculation. Moreover, since description is made based on the assumption of a PHS system which is essentially based on TDMA-TDD (Time Division Multiple Access/Time Division Duplex), it is not even clear whether transmission and reception are performed concurrently or not.

Now, suppose transmission and reception are performed concurrently, and turning back is realized by a certain technique, it is inferred after the analogy of a CW radar system that transmission/reception separation means based on a circulator is utilized in transmission/reception sections 831 and 841. Since the circulator used herein is of a large size, it is not suitable for small terminals.

Further, in the distance calculation by the mobile communication system of Patent Document 1, since each mobile radio terminal apparatus will use a communication control center, it is not possible for each mobile radio terminal apparatus to directly measure the distance to another mobile radio terminal apparatus.

FIG. 3 shows the positioning technique by the positioning-capable mobile communication system according to Patent Document 2 (Japanese Patent Laid-Open No. 2006-42201).

In Patent Document 2, the configuration is such that two carrier waves are transmitted from the transmission side and the phase difference between them is measured at the reception side to perform distance measurement. It is noted here that since the phase difference is generated from the frequency difference, a long wavelength (difference) can be employed unlike Patent Document 1.

Hereafter, explanation will be made according to the description in paragraphs 52 to 72 of Patent Document 2.

In FIG. 3, the ordinate shows the amplitudes of the first and second carrier waves and the abscissa shows distance. Symbol R represents the distance from a mobile terminal of transmission side to a mobile terminal of reception side. At the mobile terminal of transmission side, the first and second carrier waves are synchronized. Therefore, the phases of the first and second carrier waves are in agreement with each other at the mobile terminal of transmission side. $\Delta\phi$ indicates the phase difference between the first and second carrier waves at the mobile terminal of reception side, where $-\pi \leq \Delta\phi \leq \pi$.

Hereafter, a method of calculating distance R from a mobile terminal of transmission side to a mobile terminal of reception side, based on phase difference $\Delta\phi$ between the first and second carrier waves will be described.

Suppose the velocity of radio wave is c, the wavelength of the carrier wave is $\lambda$, the frequency of the carrier wave is f, and the period of carrier wave is T, the following equation holds:

$$c = \lambda/T = \lambda f \quad (1)$$

From above equation (1), the angular frequency w of the carrier wave is given as follows.

$$\omega = 2\pi/T = 2\pi f \quad (2)$$

Distance R is represented by phase as $2\pi R/\lambda$ [rad].

From above equation (1), phase is represented as the following equation:

$$2\pi R/\lambda = 2\pi R f/c \quad (3)$$

Here, the first and second carrier waves at the mobile terminal of transmission side are represented by equations (4) and (5):

$$w1T = \sin(2\pi f1 t + \phi1) \quad (4)$$

$$w2T = \sin(2\pi f2 t + \phi2) \quad (5)$$

In above equations (4) and (5), w1T and w2T are respectively the amplitudes of the first and second carrier waves at the mobile terminal of transmission side, t is time, and $\phi1$ and $\phi2$ are respectively the phases of the first and second carrier waves at the mobile terminal of transmission side.

From above equations (3), (4) and (5), the first and second carrier waves at the mobile terminal of reception side can be represented respectively by equations (6) and (7):

$$w1R = \sin(2\pi f1 t - 2\pi R f1/c + \phi1) \quad (6)$$

$$w2R = \sin(2\pi f2 t - 2\pi R f2/c + \phi2) \quad (7)$$

In above equations (6) and (7), w1R and w2R are respectively the amplitudes of the first and second carrier waves and t is time, at the mobile terminal of reception side.

At transmitter 1, the first and second carrier waves are synchronized and therefore $\phi1 = \phi2$.

Therefore, from above equations (6) and (7), phase difference $\Delta\phi$ between the first and second carrier waves at the mobile terminal of reception side are given as follows:

$$\Delta\phi = 2\pi R/c \cdot (f1 - f2) = 2\pi R/c \cdot \Delta f \quad (8)$$

In above equation (8), $\Delta f$ is the difference between first frequency f1 and second frequency f2. The above equation (8) may be modified into the following equation:

$$R = (c/2\pi) \cdot (\Delta\phi/\Delta f) = (c\Delta\phi)/(2\pi\Delta f)(-\pi \leq \Delta\phi \leq \pi) \quad (9)$$

Here, suppose a case in which difference M between first frequency f1 and second frequency f2 is set to be 1.0 MHz. In this case, when phase difference $\Delta\phi$ becomes $\pi$, distance R is calculated from above equation (9) as follows:

$$R = (3.0 \times 10^8 \times \pi)/(2\pi \times 1.0 \times 10^6) = 150 [m]$$

What is described so far is the explanation described in Patent Document 2. Here, a problem with the technique of Patent Document 2 lies in equation (8). Since phase difference $\Delta\phi$ of the carrier waves at the mobile terminal of reception side, which is obtained by subtracting the coefficient of the sine term in equation (7) from the coefficient of the sine term in equation (6), must be $$\Delta\phi = 2\pi(R/c - t) \cdot (f1 - f2) \quad (10)$$

and therefore $\Delta\phi$ will change in time, distance cannot be calculated without time information (time at the moment when $\phi1 = \phi2$ is satisfied at the transmission side) and therefore, in fact, the technique disclosed in Patent Document 2 cannot be practiced without time information.

Moreover, when a case is assumed in which the aforementioned technique can be practiced, two different frequencies are supposed to be transmitted concurrently. When two different frequencies are transmitted concurrently, the peak power will be twice as large as the average power. Since the transmission/reception system is designed in accordance with the peak power, when the difference between the average power and the peak power increases, power consumption for the same transmission power will increase. This is also true with wideband modulation schemes such as CDMA and OFDM.

Patent Document 1: Japanese Patent Laid-Open No. 11-178038

Patent Document 2: Japanese Patent Laid-Open No. 2006-42201

DISCLOSURE OF THE INVENTION

Problems to be Solved by the Invention

It is an object of the present invention to provide a system for performing distance measurement, which is implementable without using any of an atomic clock, a base station synchronized with an atomic clock, a reflected wave, a sound wave, or a wideband communication.

Patent Documents 1 and 2, which have been proposed to achieve the same object, are difficult to implement as described above. The reasons are that there is no specific description on the turn-back means and the distance calculation method in the case of Patent Document 1, and that the phase difference of the carrier waves of two frequencies will change in time and therefore distance cannot be calculated without time information in the case of Patent Document 2.

Further, even if implementation is possible, Patent Document 1 has a problem that it is not suitable for size reduction.

That is because a circulator is necessary for transmission/reception separation. The reason is that transmission/reception separation is not possible when transmission/reception frequencies are the same. If separate frequencies for transmission/reception are used, it will still be impossible to calculate distance without time information as with Patent Document 2. That is because the phase difference between two carrier waves of different frequencies will have changed in time.

When it is supposed that Patent Document 2 can be implemented, or when another wideband modulation scheme is used as well, a problem arises in that power consumption for the same transmission power increases. This is because the difference between the average power and the peak power generally increases in wideband modulation.

It is an object of the present invention to realize a multiband transceiver including a distance measurement function and by using the same, to provide a positioning system which is implementable at low cost without using an atomic clock, a base station synchronized with an atomic clock, a reflected wave, a sound wave or a wideband communication.

Means for Solving the Problems

The multiband transceiver of the present invention is a multiband transceiver including means of concurrently performing transmission and reception using two or more different frequencies, the multiband transceiver characterized by comprising:
 a first local oscillator for generating a first frequency;
 a second local oscillator for generating a second frequency;
 phase-difference setting means for setting a first phase difference between a transmission signal and an output of the aforementioned first local oscillator;
 phase-difference detection means for detecting a second phase difference which is the phase difference between a reception signal and an output of the aforementioned second local oscillator; and
 calculation means for calculating a distance to a communication counterpart from a third phase difference and a fourth phase difference which are notified by the communication counterpart, and from the aforementioned first phase difference and second phase difference, wherein the third phase difference is set to the second frequency by the communication counterpart, and the fourth phase difference is detected in the first frequency by the communication counterpart.

The multiband transceiver according to another exemplary embodiment is a multiband transceiver including means of concurrently performing transmission and reception using two or more different frequencies, the multiband transceiver characterized by comprising:
 a first local oscillator for generating a first frequency;
 a second local oscillator for generating a second frequency;
 phase-difference detection means for detecting a second phase difference which is the phase difference between a reception signal and an output of the aforementioned second local oscillator; and
 phase-difference setting means for setting a phase difference between a transmission signal and an output of the aforementioned first local oscillator as a first phase difference, wherein assuming that the ratio of the aforementioned first frequency and second frequency is 1 to m, the phase difference is a value resulting from multiplying the aforementioned second phase difference by m, or a value resulting from adding a constant to the result of the multiplication by m.

The multiband transceiver according to a further exemplary embodiment is a multiband transceiver including means of concurrently performing transmission and reception using two or more different frequencies, the multiband transceiver characterized by comprising:
 a first local oscillator for generating a first frequency;
 a second local oscillator for generating a second frequency;
 phase-difference detection means for detecting a first phase difference which is the phase difference between a reception signal and an output of the aforementioned second local oscillator;
 phase-difference setting means for setting a second phase difference between a transmission signal and an output of the aforementioned first local oscillator; and
 calculation means which, from a signal from the multiband transceiver according to another exemplary embodiment described above as a communication counterpart, determines a third phase difference which is set to a second frequency by the communication counterpart and a fourth phase difference which is set to a first frequency by the communication counterpart, and calculates the distance to the communication counterpart from the aforementioned first phase difference or second phase difference.

The multiband transceiver according to a further exemplary embodiment is a multiband transceiver including means of concurrently performing transmission and reception using two or more different frequencies, the multiband transceiver characterized by comprising:
 a first local oscillator for generating a first frequency;
 a second local oscillator for generating a second frequency;
 first phase-difference setting means for setting a first phase difference between a reception signal and the aforementioned first frequency;
 second phase-difference setting means for setting a second phase difference between a reception signal and the aforementioned second frequency; and
 notification means for notifying the aforementioned first phase difference and second phase difference to a communication counterpart.

In the multiband transceiver of the present invention configured as described above, the distance to a communication counterpart is calculated by determining a phase difference between a local oscillator used for transmission by the communication counterpart and a local oscillator used for transmission by the transceiver itself. Since it is possible to determine its own position based on the communication result with three or more multiband transceivers whose positions are known, it becomes possible to make up a positioning system.

As so far described, according to the present invention, it is possible to perform distance measurement by means of radio waves without using an atomic clock, a base station synchronized with an atomic clock, a reflected wave, a sound wave, or wideband communication.

DESCRIPTION OF SYMBOLS

100 MULTIBAND TRANSCEIVER
101 HIGH-FREQUENCY AMPLIFIER
102 ANTENNA
103 ORTHOGONAL MODULATOR
104 ORTHOGONAL DEMODULATOR
105 BASEBAND TRANSMITTER
106 BASEBAND RECEIVER
107 CARRIER WAVE FREQUENCY GENERATOR

BEST MODE FOR CARRYING OUT THE INVENTION

Next, exemplary embodiments will be described with reference to the drawings.

Figure 1:
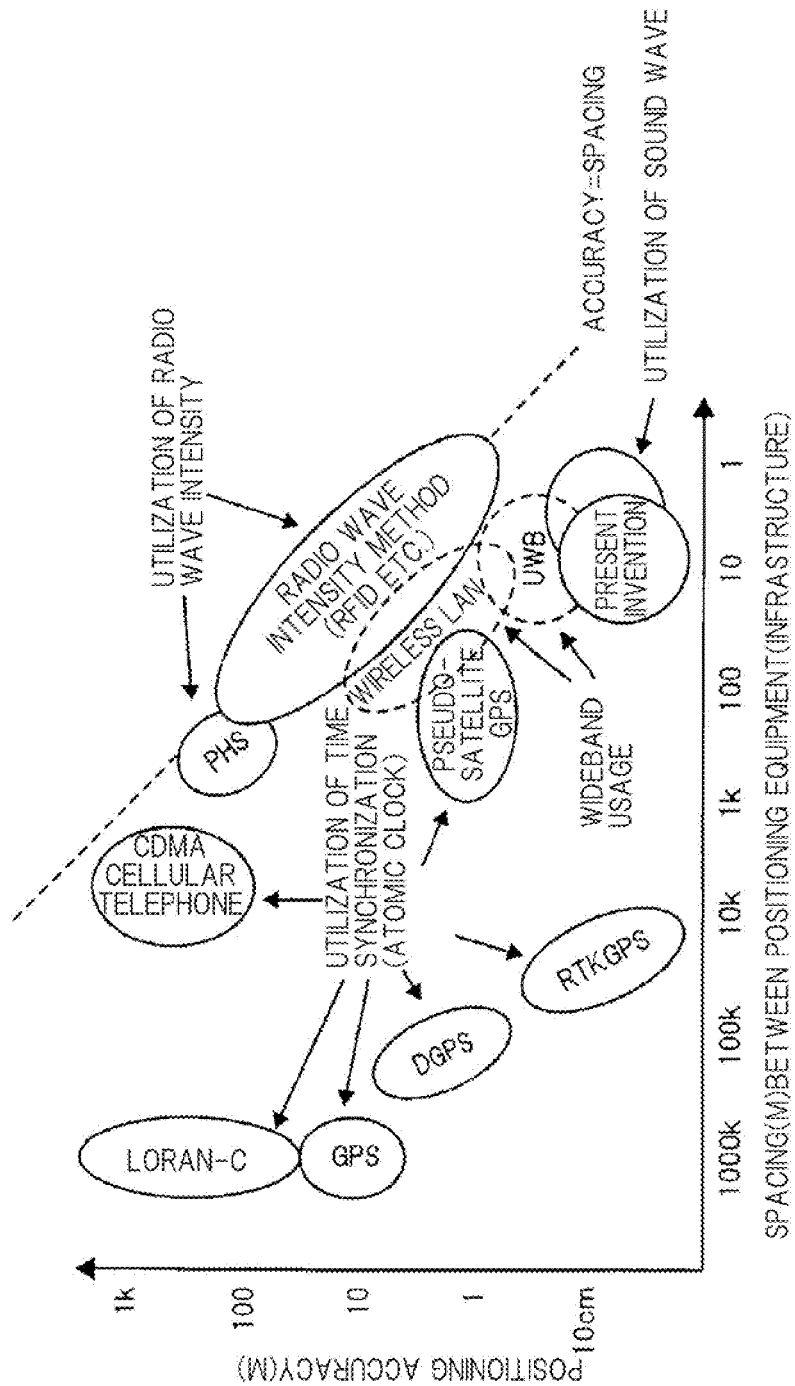
FIG. 1 shows a comparison of positioning systems.
Figure 2:
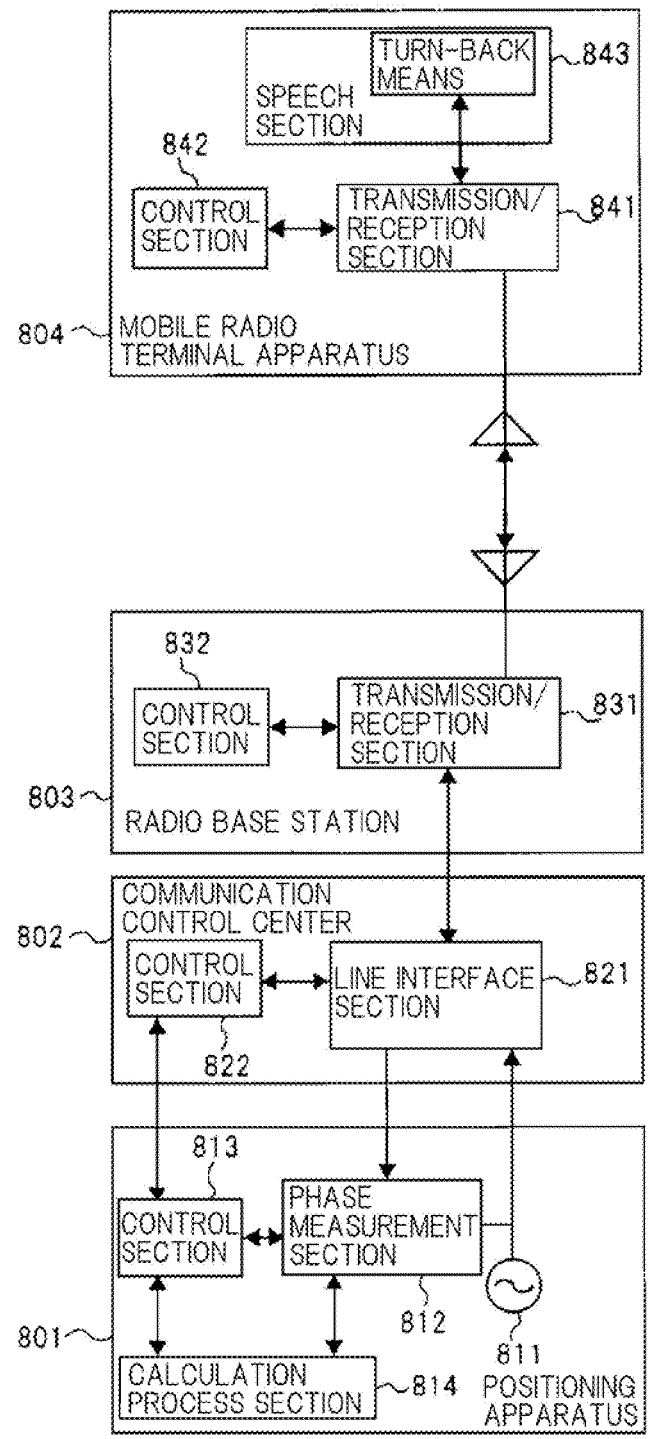
FIG. 2 is a block diagram to show the configuration of a positioning-capable mobile communication system described in Patent Document 1.
Figure 3:
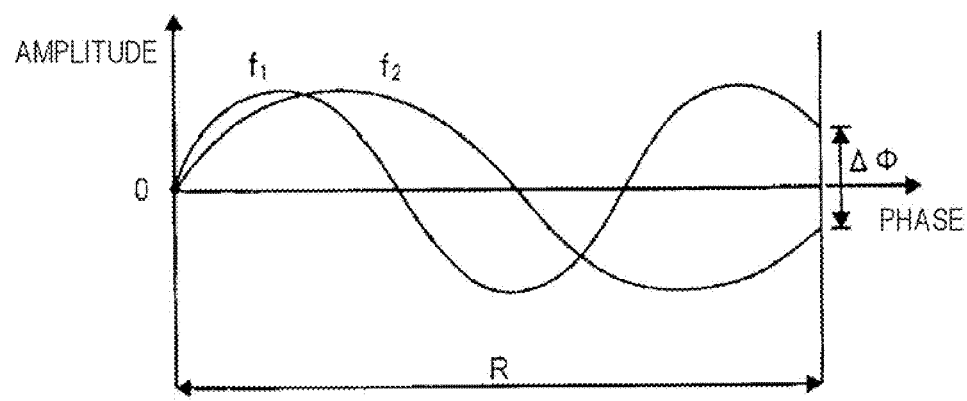
FIG. 3 shows a positioning technique by the positioning-capable mobile communication system described in Patent Document 2 (Japanese Patent Laid-Open No. 2006-42201)
Figure 4:
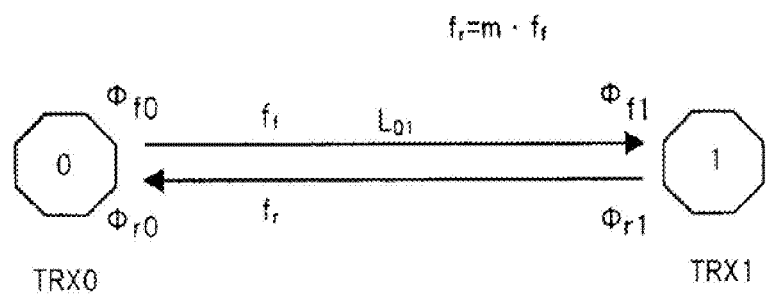
FIG. 4 shows an exemplary embodiment of the positioning sensor of the present invention.

FIG. 4 illustrates the principle of the positioning method according to the present invention. With reference to FIG. 4, description will be made of a case in which positioning is performed by using a multiband transceiver which is capable of phase modulation/demodulation like an orthogonal modulator-demodulator.

Suppose the distance between transceiver TRX0 at the left side in the figure and transceiver TRX1 at the right side is $L_{01}$. Each transceiver includes an orthogonal modulator-demodulator and transports phase information. When a baseband signal of phase $\phi_{f0}$ is transmitted from transceiver TRX0, it is transported from the orthogonal modulator as a signal with frequency $f_f$. Transceiver TRX1 receives this signal with frequency $f_r$ to acquire phase $\phi_{f1}$ of the baseband signal as the reception result.

Now, suppose the phase difference between the local oscillator of transceiver TRX0 and the local oscillator of transceiver TRX1 is $\Delta\phi$, reception phase $\phi_{f1}$ is represented by the following relational equation:

[Expression 1]

$$\phi_{f1} = -\frac{2\pi L_{01}}{\lambda_f} - \Delta\phi(t) + \phi_{f0} \qquad (11)$$

On the other hand, transceiver TRX1 transmits a baseband signal of phase $\phi_{r1}$. The signal is transported by an orthogonal modulator as a signal with frequency $f_r$. Here, transmission/reception frequencies $f_r$ and $f_f$ of TRX1 are in the relationship of $f_r = m \times f_f$. This reference character m indicates a rational number having a positive value. Here, when m is an integer or an integral fraction, especially a power of 2 or fractional power of 2, the process to create both signals by a frequency divider is easy to handle.

Since the phase difference between the local oscillators is $m \times \Delta\phi$ as well, reception phase $\phi_{r0}$ at transceiver TRX0 is given as follows:

[Expression 2]

$$\phi_{r0} = -\frac{2\pi L_{01}}{\lambda_r} + m\Delta\phi(t) + \phi_{r1} \qquad (12)$$

Determining $\Delta\phi$ from equation 11, substituting it into equation 12, and then solving the equation for $L_{01}$ will result in the following:

[Expression 3]

$$L_{01} = \frac{\lambda_r}{4\pi}\{\phi_{r1} - \phi_{r0} + m(\phi_{f0} - \phi_{f1})\} \qquad (13)$$

Since transceiver TRX0 is aware of $\phi_{r0}$ and $\phi_{f0}$, and transceiver TRX1 is aware of $\phi_{r1}$ and $\phi_{f1}$ respectively, it is possible to determine L within a range of $0 \leq L_{01} \leq \lambda r/2$ (range of $0 \leq \phi < 2\pi$) by notifying the remaining two parameters to the counterpart.

Now, suppose transmission phase $\phi_{r1}$ is $\phi_{r1} = m \times \phi_{f1}$, the following holds:

[Expression 4]

$$L_{01} = \frac{\lambda_r}{4\pi}(m\phi_{f0} - \phi_{r0}) \qquad (14)$$

Thus, transceiver TRX0 can calculate distance $L_{01}$ only with information possessed by itself. Further, for example, suppose the transmission phase of transceiver TRX0 is 0, the following relation will result:

[Expression 5]

$$L_{01} = -\frac{\lambda_r}{4\pi}\phi_{r0} \qquad (15)$$

Since the observation results of phase $\phi_x$ all fall in the range of $0 \leq \phi_x < 2\pi$, when measurement is done with two waves, measurable distance $L_{01}$ is limited within a range $0 \leq L_{01} < \lambda r/2$. However, even when the value of $L_{01}$ is larger than $\lambda r/2$, measurement is made possible by combining results at a certain number of frequencies. Moreover, it is also envisioned that the positioning apparatus of the present invention is used in combination with another positioning technique such as radio wave intensity to narrow the range of $0 \leq L_{01} < \lambda r/2$.

First Exemplary Embodiment

Figure 5:
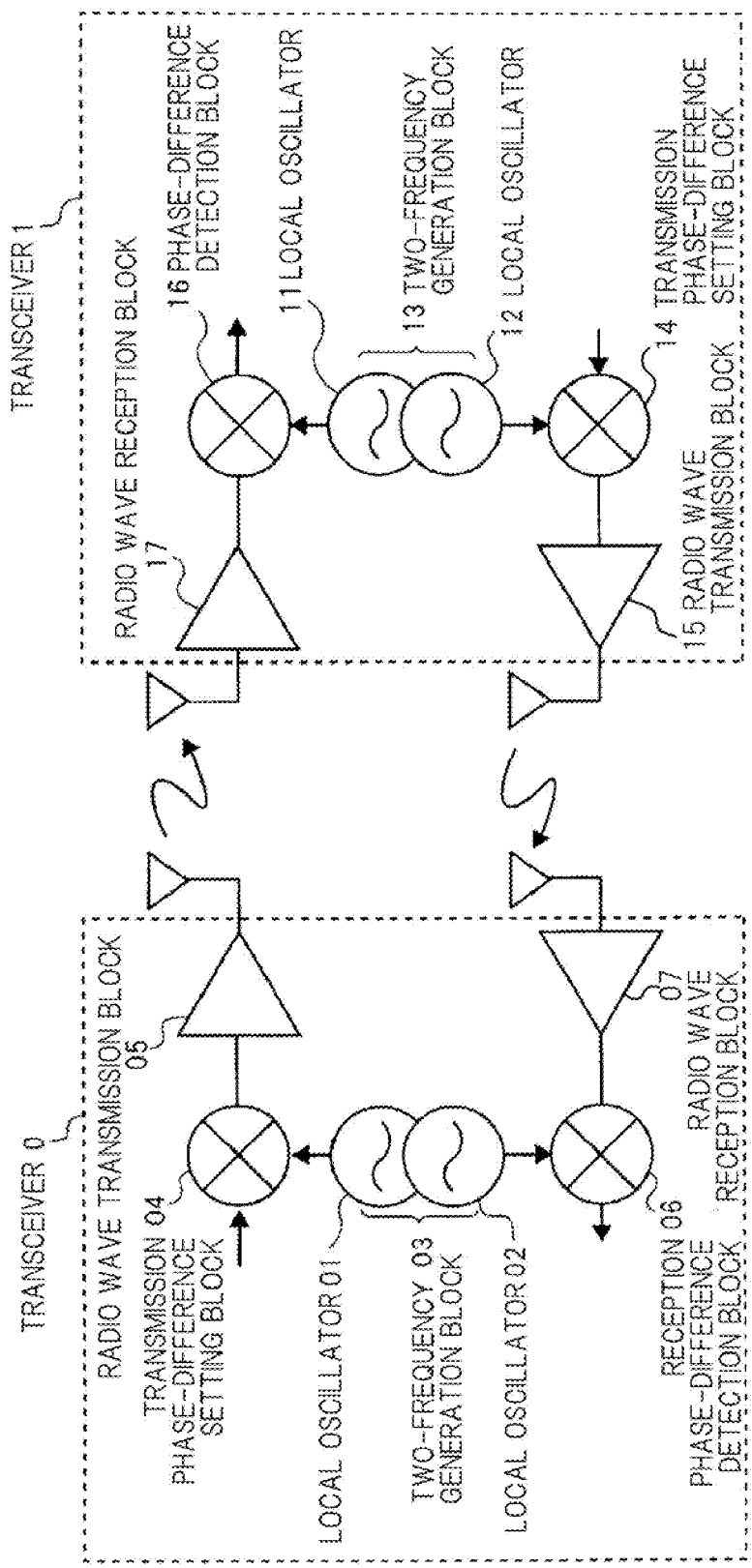
FIG. 5 illustrates a first exemplary embodiment.

FIG. 5 shows a first exemplary embodiment.

Two transceivers (TRX)0 and (TRX)1 respectively include radio wave transmission block 05, 15, radio wave reception block 07, 17, transmission phase-difference setting block 04, 14, reception phase-difference detection block 06, 16, and two-frequency generation block 03, 13. Two-frequency generation block 03 is made up of local oscillators 01 and 12, and two-frequency generation block 13 is made up of local oscillators 11 and 12.

At two-frequency generation block 03 of transceiver TRX0, local oscillator 01 and local oscillator 02 generate two frequencies which are in a relationship of 1-to-m (m is a rational number), and at two-frequency generation block 13 of transceiver TRX1, local oscillator 11 and local oscillator 12 generate two frequencies which are in a relationship of 1-to-m (m is a rational number).

At transmission phase-difference setting block 04 of transceiver TRX0, a phase difference between local oscillator 01 and transmission radio wave is set, and at transmission phase-difference setting block 14 of transceiver TRX1, a phase difference between local oscillator 12 and transmission radio wave is set.

At reception phase-difference detection block 06 of transceiver TRX0, a phase difference between the received radio wave and local oscillator 02 is detected, and at reception phase-difference detection block 16 of transceiver TRX1, a phase difference between the received radio wave and local oscillator 11 is detected.

Moreover, transceiver TRX0 or transceiver TRX1 has a function of calculating the phase difference between the communication counterpart and its local oscillator from the detected phase difference, or canceling the phase difference.

Further, in FIG. 5, although separate antennas for transmission and reception are illustrated, needless to say, it is possible to mix the transmission and reception by using an antenna mixer or filter since their frequencies are different.

Moreover, similarly, the transmitter, the receiver, the local oscillator, the antenna, and the like may be installed respectively in two units for each two frequencies separately.

Figure 6:
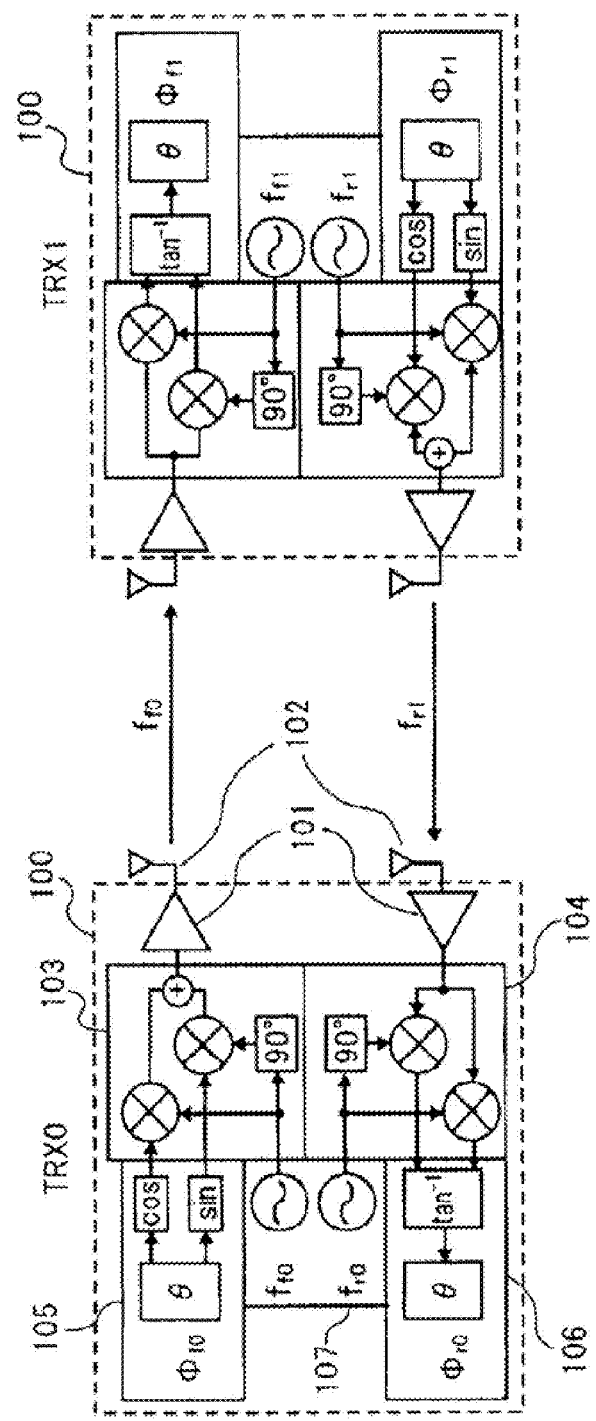
FIG. 6 illustrates the first exemplary embodiment.

Further, each block in FIG. 5 can be constructed on a computer system by software, and can also be implemented by hardware alone. Moreover, they can be implemented by combining hardware and software as well, and may be implemented by any of those methods. FIG. 6 is a block diagram to show the configuration of concrete examples of transceiver TRX0 and transceiver TRX1 in FIG. 5.

Transceiver TRX0 and transceiver TRX1 shown in FIG. 6 have the same configuration and are made up of high-frequency amplifier 101, antenna 102, orthogonal modulator 103, orthogonal demodulator 104, baseband transmitter 105, and baseband transmitter 106. In FIG. 6, reference symbols are given to each component only for transceiver TRX0, and are omitted for transceiver TRX1.

Transmission phase $\phi_{f0}$ at transceiver TRX0 is transformed into $\cos\phi_{f0}$ and $\sin\phi_{f0}$ by baseband transmitter 105. The transformed signal is multiplied by $\cos 2\pi f_{f0}t$ and $-\sin 2\pi f_{f0}t$ by orthogonal modulator 103 to obtain the following result as the output of orthogonal modulator 103:

[Expression 6]
$$V_{f0} = \cos 2\pi f_{f0}t \times \cos\phi_{f0} - \sin 2\pi f_{f0}t \times \sin\phi_{f0} \quad (16)$$
$$= \cos(2\pi f_{f0}t + \phi_{f0})$$

The output signal is amplified to an appropriate amplitude at amplifier 101 and emitted from antenna 102.

The signal is received by antenna 102 of transceiver TRX1 in time $t_{01}$, later, and is amplified to an appropriate amplitude at amplifier 101, and is thereafter input into orthogonal demodulator 104. Suppose the phase difference at time t=0, between the local oscillator of frequency $f_{f0}$ of transceiver TRX0 and the local oscillator of frequency $f_{f1}$, of transceiver TRX1, is $\phi_1$, the signal is multiplied by $\cos(2\pi f_{f1}t+\phi_1)$ and $-\sin(2\pi f_{f1}t+\phi_1)$ at orthogonal demodulator 104, and the following:

[Expression 7]
$$V_{f1I} = \cos(2\pi f_{f1}t + \phi_1) \times \cos(2\pi f_{f0}(t - t_{01}) + \phi_{f0}) \quad (17)$$
$$= \frac{1}{2}\cos\{2\pi(f_{f0} - f_{f1})t - \phi_1 - 2\pi f_{f0}t_{01} + \phi_{f0}\} +$$
$$\frac{1}{2}\cos\{2\pi(f_{f0} + f_{f1})t + \phi_1 - 2\pi f_{f0}t_{01} + \phi_{f0}\}$$

[Expression 8]
$$V_{f1Q} = -\sin(2\pi f_{f1}t + \phi_1) \times \cos(2\pi f_{f0}t + \phi_{f0}) \quad (18)$$
$$= \frac{1}{2}\sin\{2\pi(f_{f0} - f_{f1})t - \phi_1 - 2\pi f_{f0}t_{01} + \phi_{f0}\} -$$
$$\frac{1}{2}\sin\{2\pi(f_{f0} + f_{f1})t + \phi_1 - 2\pi f_{f0}t_{01} + \phi_{f0}\}$$

are output as the output of orthogonal demodulator 104, where, $f_{f1}$ and $f_{f0}$ are very close (ideally the same) frequencies.

The output of orthogonal demodulator 104 is output through a lowpass filter (not shown). The lowpass filter is adapted to cut off a frequency of $f_{f0}+f_{f1}$, and what is obtained as the output of orthogonal demodulator 104 are as follows:

[Expression 9]
$$V_{f1I} = \frac{1}{2}\cos\{-2\pi f_{f0}t_{01} - \Delta\phi(t) + \phi_{f0}\} \quad (19)$$

[Expression 10]
$$V_{f1Q} = \frac{1}{2}\sin\{-2\pi f_{f0}t_{01} - \Delta\phi(t) + \phi_{f0}\} \quad (20)$$

Here, the following is assumed:

[Expression 11]
$$\Delta\phi(t) = \phi_1 - 2\pi(f_{f0} - f_{f1})t \quad (21)$$

This corresponds to the phase difference between the local oscillator of frequency $f_{f0}$ of transceiver TRX0 and the local oscillator of frequency $f_{f1}$ of transceiver TRX1 at time t:

Therefore, reception phase $\phi_{f1}$ obtained by baseband receiver 105 of transceiver TRX1 is as follows.

[Expression 12]
$$\phi_{f1} = -2\pi f_{f0}t_{01} - \Delta\phi(t) + \phi_{f0} \quad (22)$$

Similarly, when performing transmission from transceiver TRX1 to transceiver TRX0 using a frequency of a multiple of a positive rational number m, by making substitutions: $f_{f0} \to f_{r1}$, $f_{f1} \to f_{r0}$, $\phi_{f0} \to \phi_{r1}$, $\phi_{f1} \to \phi_{r0}$, $\Delta\phi \to -m\Delta\phi$, $t_{01} \to t_{10}$, phase $\phi_{r0}$ obtained by the baseband receiver of transceiver TRX0 can be derived as follows:

[Expression 13]
$$\phi_{r0} = -2\pi f_{r1}t_{10} + m\Delta\phi(t) + \phi_{r1} \quad (23)$$

Since, $t_{01}$, and $t_{10}$ are radio wave arrival times from transceiver TRX0 to transceiver TRX1 and from transceiver TRX1 to transceiver TRX0 respectively, they are represented by using radio wave velocity c and arrival distance $L_{01}$ as follows:

[Expression 14]
$$t_{01} = t_{10} = \frac{L_{01}}{c} \quad (24)$$

Determining $\Delta\phi(t)$ from Equation 22, substituting it into Equation 23, and solving the equation for $L_{01}$ by utilizing the relation of Equation 24, one will obtain:

[Expression 15]
$$L_{01} = \frac{c}{2\pi(f_{r1} + mf_{f0})}\{\phi_{r1} - \phi_{r0} + m(\phi_{f0} - \phi_{f1})\} \quad (25)$$

Since, $mf_{f0} = f_{r0} \approx f_{r1}$, the following equation holds:

[Expression 16]
$$L_{01} \simeq \frac{c}{4\pi f_{r1}}\{\phi_{r1} - \phi_{r0} + m(\phi_{f0} - \phi_{f1})\} \quad (26)$$

Therefore, provided each one of transceiver TRX0 and transceiver TRX1 can know the phase received by the other at same time period, it becomes possible to measure the distance to each other.

Here, regarding to the exactness of the expression "at the same time period", equations 22 and 23 include time dependent terms. However, $f_{f0}$ and $f_{f1}$, and $f_{r0}$ and $f_{r1}$ are ideally the same frequency, respectively. Even when an error in the frequency reference between transceiver TRX0 and transceiver TRX1 is taken into consideration, they are still very close frequencies. Therefore, as is clear from Equation 21, it is possible to make the temporal change very small, and time synchronization does not need to be performed with so much accuracy.

Here, for example, suppose transmission phase $\phi_{r1}$ of TRX1 is given as $\phi_{r1}=m\times\phi_{f1}$, then:

[Expression 17]

$$L_{01} \simeq \frac{c}{4\pi f_{r1}}(m\phi_{f0} - \phi_{r0}) \quad (27)$$

is obtained, and transceiver TRX0 can calculate distance $L_{01}$ only with the information that it possesses.

In the description so far, the amplitudes in each equation have been omitted for simplicity.

Moreover, though a certain amount of phase rotation etc. may take place in the transmission/reception circuit, it is expected to be a fixed value within a constant error range due to variations of production and temperature, and therefore it can be subtracted during actual distance measurement.

(mPSK Modulation)

Here, as is clear from Equations 26 and 27, when m is an integer, there will be no effect on the distance calculation even if transceiver TRX0 shifts phase difference $\phi_{f0}$, which is to be set by itself, by $2\pi/m$.

For example, when m is 4, setting phase difference $\phi_{f0}$ to be $\phi_{f0}+2\pi/m$, $\phi_{f0}+2\times2\pi/m$, $\phi_{f0}+3\times2\pi/m$ will not affect the results of Equations 26 and 27. Therefore, the signal from TRX0 to TRX1 can be mPSK (m value Phase-Shift Keying) modulated.

(Range of m)

Moreover, as seen from Equations 26 and 27, the accuracy of position detection depends on the accuracy of phase detection, and is generally about several tenths. Since multiplying the reception phase by m will result in that the error also has been multiplied by m, the usable frequency ratio of the two frequencies is generally not more than 100 times. However, since the accuracy of phase detection is significantly affected by the signal-noise ratio of the reception signal as well, the accuracy of phase detection will be reduced by a factor of 20 to 30 in a situation where there is much noise, and in such a case, the usable frequency ratio of two frequencies will be up to about 20 to 30 times.

(Turned Back Only when Reception Power is Sufficiently Large)

A mechanism may be included whereby when transmission phase $\phi_{r1}$ of transceiver TRX1 is turned back as $\phi_{r1}=m\times\phi_{f1}$, transmission is stopped, or a predetermined signal is sent when a received signal has been buried in noise.

Second Exemplary Embodiment

Figure 7:
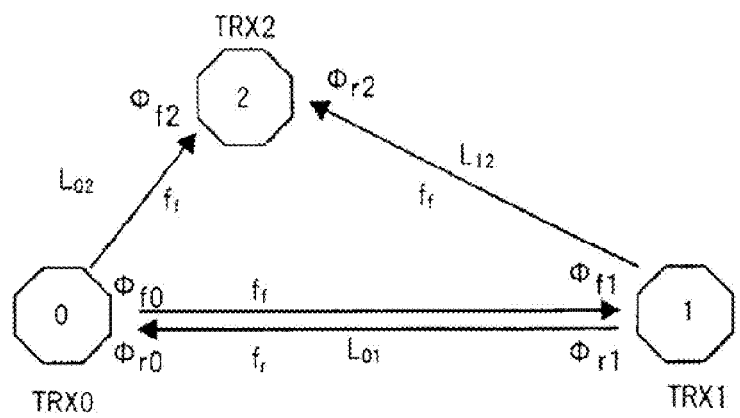
FIG. 7 illustrates a second exemplary embodiment.

FIG. 7 shows a second exemplary embodiment.

Suppose that the distance between transceiver TRX0 and transceiver TRX1 is $L_{01}$, the distance between transceiver TRX0 and transceiver TRX2 is $L_{02}$, and the distance between transceiver TRX1 and transceiver TRX2 is $L_{12}$.

When a signal of phase $\phi_{f0}$ and frequency $f_f$ is transported from transceiver TRX0, transceiver TRX2 receives the signal of this frequency $f_f$ and obtains phase $\phi_{f2}$ of baseband signal as a reception result. At the same time, when a signal of phase $\phi_{r1}$ and frequency $f_r$ is transported from transceiver TRX0, transceiver TRX2 receives the signal of this frequency $f_r$ and obtains phase $\phi_{r2}$ of baseband signal as a reception result. Here, frequencies $f_r$ and $f_f$ are in the relationship of $f_r=m\times f_f$.

Suppose the phase difference between the local oscillator of frequency $f_f$ of transceiver TRX0 and the local oscillator of frequency $f_f$ of transceiver TRX1 is $\Delta\phi_{01}$, the phase difference between the local oscillator of frequency $f_f$ of transceiver TRX0 and the local oscillator of frequency $f_f$ of transceiver TRX2 is $\Delta\phi_{02}$, the phase difference between the local oscillator of frequency $f_f$ of transceiver TRX1 and the local oscillator of frequency $f_f$ of transceiver TRX2 is A $\Delta\phi_{12}$, and the phase difference of the local oscillator of frequency $f_r$ becomes m times, reception phases $\phi_{f2}$ and $\phi_{r2}$ are represented by the following relational equations:

[Expression 18]

$$\phi_{f2} = -\frac{2\pi L_{02}}{\lambda_f} - \Delta\phi_{02} + \phi_{f0} \quad (28)$$

[Expression 19]

$$\phi_{r2} = -\frac{2\pi L_{12}}{\lambda_f} - \Delta m\phi_{12} + \phi_{r1} \quad (29)$$

where, $\Delta\phi_{12}$ is given as follows:

[Expression 20]

$$\Delta\phi_{12}=-\Delta m\phi_{01}+\Delta m\phi_{02} \quad (30)$$

Since $\Delta\phi_{01}$ corresponds to $\Delta\phi$ in Equation 11, by further determining $\Delta\phi_{02}$ from Equation 28 and substituting Equation 30 into Equation 29, the following relation will be obtained:

[Expression 21]

$$L_{12} = \frac{\lambda_r}{2\pi}\{\phi_{r1} - \phi_{r2} + m(\phi_{f2} - \phi_{f1})\} + L_{01} - L_{02} \quad (31)$$

Since $\phi_{r2}$ and $\phi_{f2}$ are known, transceiver TRX2 can determine $L_{02}$ within a range of $0 \leq L_{01} < \lambda r/2$ (range of $0 \leq \phi < 2\pi$) by being notified of remaining parameters by TRX0 and TRX1.

Here, of course, $L_{01}$ and $L_{02}$ may be determined by using the technique of the first exemplary embodiment.

Figure 8:
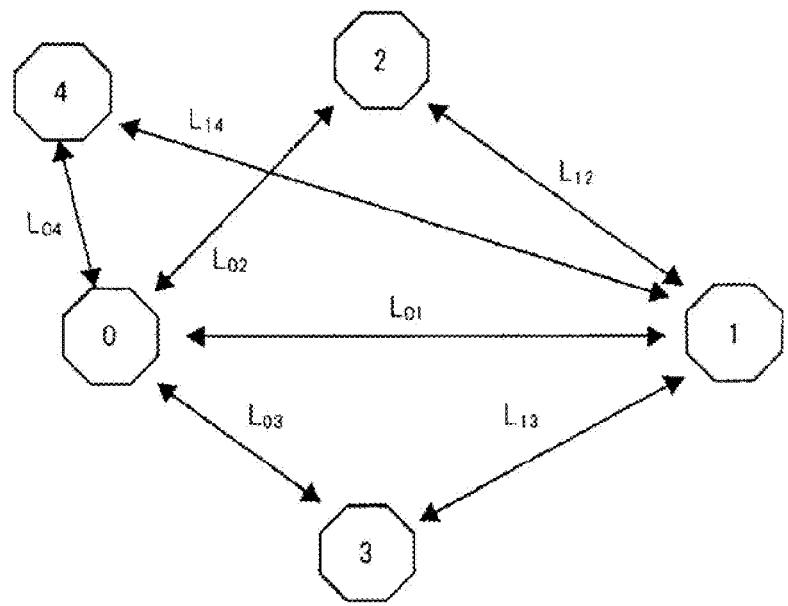
FIG. 8 illustrates the second exemplary embodiment.

Further, in the case as shown in FIG. 8, if the positions of TRX0, TRX2, TRX3, and TRX4, which are not on the same plane, are known, it is possible to determine the three dimensional position of TRX1 by using the technique of the present exemplary embodiment. When TRX0, TRX1, TRX2, and TRX3 are on the same plane, if the positions of TRX0, TRX2, and TRX3, which are not on the same line, are known, it is possible to determine the two dimensional position of TRX1 by using the technique of the present exemplary embodiment.

EXAMPLES

Example 1

Figure 9:
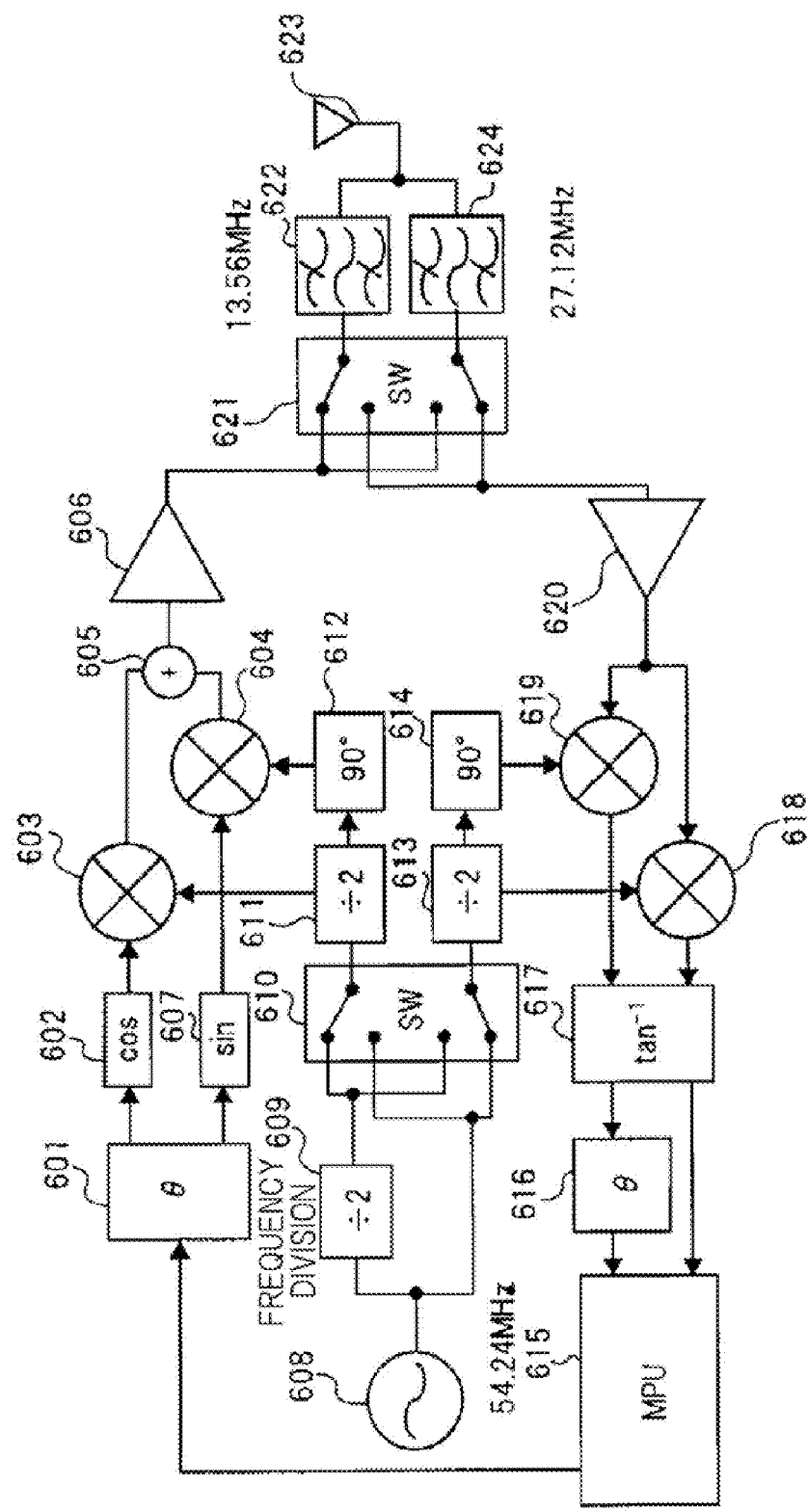
FIG. 9 illustrates examples of the present invention.

FIG. 9 illustrates a first example of the present invention.

FIG. 9 is a circuit diagram to show the configuration of an example of the multiband transceiver used in the present invention.

The present example is made up of phase-setting device 601, phase calculator 617, cosine signal generator 603, mixers 603, 604, 618 and 619, adder 605, high-frequency amplifiers 606 and 620, reference signal source 608, frequency dividers 609, 611 and 613, switches 610 and 621, phase shifters 612 and 614, micro processor (MPU) 615, bandpass filters 622 and 624, and antenna 623.

When the multiband transceiver shown in FIG. 9 acts as transceiver TRX0 in the first exemplary embodiment, a phase in accordance with the signal indicating the phase instructed by microprocessor (MPU) 615 is set at phase-setting device 601. Cosine signal generator 602 and sine signal generator 607 generate a cosine signal and a sine signal in accordance with phases set at phase-setting device 601 and output them to mixers 603 and 604 respectively.

The output of reference signal source 608 which generates a reference signal of 54.24 MHz is passed through frequency divider 609 for performing frequency-division by 2, switch 610, and frequency divider 611 for performing frequency-division by 2, thereby is frequency-divided by 4 to be 13.56 MHz, is applied to mixer 603, is further passed through phase shifter 612 to be delayed by 90 degrees in phase, and is applied to mixer 604.

Each output of mixers 603 and 604 is summed by adder 605 and passed through high-frequency amplifier 606, switch 621, and bandpass filter 621 to be sent out from antenna 623.

As described above, the phase instructed from MPU 615 is transformed into a cosine signal and a sine signal and transmitted as a phase difference from a local oscillator. At the transmission side, as described above, a frequency of 13.56 MHz, which is obtained by frequency-dividing a reference signal source of 54.24 MHz by 4, is used for the local oscillator. At the reception side, only frequency divider 613 for performing frequency-division by 2 is used so that a frequency of 27.12 MHz, which is obtained by frequency-dividing 54.24 MHz by 2, is used as the frequency of local oscillator.

Upon reception, a signal received by antenna 623 is passed through bandpass filter 621 and switch 621 to be applied to mixers 618 and 619. A frequency signal of 27.12 MHz, which has been frequency-divided by 2 by being passed through switch 610 and frequency divider 613, is input into mixer 618, and a frequency signal, which is delayed by 90 degrees in phase by further being passed through phase shifter 619, is input to mixer 619. Each mixer output is input to phase calculator 617, and phase calculator 617 determines $\tan^{-1}$ of each signal to set the result in phase setting device 616. MPU 615 calculates distance from the phase which has been set in phase setting device 616.

As described above, a first local oscillator is made up of reference signal source 608 and frequency dividers 609 and 611, and a second local oscillator is made up of reference signal source 608 and frequency divider 613. Further, a phase-difference setting block is made up of mixers 603 and 604 and phase shifter 612, phase-difference detection block is made up of mixers 618 and 619 and phase shifter 614, and MPU 615 functions as a calculation block.

When the multiband transceiver shown in FIG. 9 acts as TRX1 in the first, exemplary embodiment, at the reception side, a frequency of 13.56 MHz, which is obtained by frequency-dividing 54.24 MHz by 4, is used as the frequency of the local oscillator. MPU 615 judges the content to be returned from the received signal. For example, when the intensity is not large enough, the reason for this is notified to TRX0, and the like. Further, a mechanism can be incorporated which limits the variation of transmission phase within a short time to a value not more than a fixed value so that the transmission bandwidth will not be expanded. Further, the phases which are set at phase shifters 612 and 619 are notified to transceiver TRX0 and transceiver TRX1 so that each of them can know the phase received by the other at the same time.

Here, the relation of $f_f$ and $f_r$ is 1:2. Since MPU receives phases as binary numbers, when returning it as $\phi_{r1}=2\times\phi_{f1}$, it can be easily doubled by left shifting by one bit.

To determine $\tan^{-1}$, an algorithm called CORDIC is often used. This calculation takes require a few clocks when performed in a sequential circuit. If the frequencies of the reference signal sources of TRX0 and TRX1 are shifted and the difference thereof is constant, the phase difference to be detected will vary at a constant rate. Here, when that variation is fast and CORDIC calculation and transfer time at MPU are not negligible, it is possible to reduce the effect of the calculation time by estimating the variation amount by the MPU and adding it as a constant.

At TRX0, distance is calculated from the received phase using the relation of Equation 27:

Example 2

It is possible to expand the measurement range by increasing the frequency to be used. For example, from the relation of Equation 27, since 13.56 MHz and 27.12 MHz are used in Example 1 and the same result will be obtained for the cases in which $L_{01}$ is 2.5 m and 8 m, it is not applicable to distances exceeding 5.5 m. However, in such a case, further using 40.68 MHz will result in that for 2.5 m, the same result as for 6.18 m and 9.85 m is expected, and for 8 m, the same result as for 0.65 m and 4.32 m is expected, as the result of which it is possible to judge which is true.

Further, since as distance increases, the intensity of the signal to be received and signal to noise ratio will decline, it is needless to say that judgment can be made based on those matters.

As seen from Equation 27 and these examples, frequencies not more than 1 GHz at which measurable range by two frequencies becomes not less than several tens of centimeters is suitable for position detection. Moreover, since 13.56 MHz, 27.12 MHz, and 40.68 MHz which are designated as ISM bands are frequencies in a relationship between integral multiples, calculation is easy. Further, since the measurement distance will be about several meters and accuracy is from several centimeters to a few tens of centimeters, it is also easy to use.

The present invention can be applied to applications for position detection used in position information services and the like.

So far, although the present invention has been described with reference to exemplary embodiments and examples, the present invention will not be limited to the aforementioned exemplary embodiments and examples. The configuration and details of the present invention are subject to various modifications which are understandable to those skilled in the art within the scope of the present invention.

The invention claimed is:

1. A multiband transceiver including means of concurrently performing transmission and reception using two or more different frequencies, the multiband transceiver characterized by comprising:
a first local oscillator for generating a first signal having a first frequency;
a second local oscillator for generating a second signal having a second frequency;

phase-difference setting means for setting a first phase difference between a transmission signal and said first signal;

phase-difference detection means for detecting a second phase difference which is the phase difference between a reception signal and said second signal; and calculation means for calculating a distance to a communication counterpart from a third phase difference and a fourth phase difference which are notified by the communication counterpart, and from said first phase difference and said second phase difference, wherein said third phase difference is set to a third signal also having the second frequency by the communication counterpart, and said fourth phase difference is detected between a fourth signal also having the first frequency and said first signal by the communication counterpart.

2. The multiband transceiver according to claim 1, characterized in that
the first local oscillator and the second local oscillator generate frequencies at which a value used as the ratio of the first frequency and the second frequency is a rational number excepting 1.

3. The multiband transceiver according to claim 2, characterized by further comprising
signal generation means for creating two frequencies which are in a relationship of a ratio of rational numbers by frequency division or multiplication from the same oscillator.

4. The multiband transceiver according to claim 2, characterized in that
assuming that the ratio of two frequencies which are in a relationship between rational numbers is 1 to m, the first local oscillator and the second local oscillator generate frequencies at which m is an integer or an integral fraction.

5. The multiband transceiver according to claim 4, characterized in that
assuming that the ratio of two frequencies which are in a relationship between rational numbers is 1 to m, the first local oscillator and the second local oscillator generate frequencies at which m is an integral power of 2.

6. The multiband transceiver according to claim 2, characterized in that
assuming that the ratio of two frequencies which are in a relationship between rational numbers is 1 to m, the first local oscillator and the second local oscillator generate frequencies at which m is not more than 100 and not less than 1/100.

7. The multiband transceiver according to claim 1, characterized in that
when calculating distance, the calculation means calculates a distance, which is more than a half wavelength away, by utilizing a measurement result using another frequency or a result measured by other distance measurement means such as radio wave intensity.

8. The multiband transceiver according to claim 1, characterized in that
the first local oscillator and the second local oscillator generate a frequency not more than 1 GHz.

9. The multiband transceiver according to claim 1, characterized in that
the first local oscillator and the second local oscillator generate a frequency of ISM band.

10. A positioning system using the multiband transceiver according to claim 1, characterized in that
calculation means determines its own position based on the result of communication with three or more multiband transceivers whose positions are known.

11. A multiband transceiver including means of concurrently performing transmission and reception using two or more different frequencies, the multiband transceiver characterized by comprising:
a first local oscillator for generating a first frequency;
a second local oscillator for generating a second frequency;
phase-difference detection means for detecting a second phase difference which is the phase difference between a reception signal and an output of said second local oscillator; and
phase-difference setting means for setting a phase difference between a transmission signal and an output of said first local oscillator as a first phase difference, wherein assuming that the ratio of said first frequency and said second frequency is 1 to m, said phase difference is a value resulting from multiplying said second phase difference by m, or a value resulting from adding a constant to the result of the multiplication by m.

12. The multiband transceiver according to claim 11, characterized in that
assuming that the ratio of the first frequency and the second frequency is 1 to m, when the phase-difference setting means sets a phase difference which is a value of the result of multiplication of the second phase difference by m added to a constant, as a first phase difference, said constant is adapted to be a value to correct a portion of the phase corresponding to transmission/reception timing deviation.

13. The multiband transceiver according to claim 11, characterized in that
the phase-difference setting means compares reception power with a predetermined threshold and, only when the reception power is larger than said threshold, sets a phase difference, which is a value of a detected phase difference multiplied by m, or a value of the result of multiplication by m added to a constant, as the phase difference of the transmission signal.

14. A multiband transceiver including means of concurrently performing transmission and reception using two or more different frequencies, the multiband transceiver characterized by comprising:
a first local oscillator for generating a first signal having a first frequency;
a second local oscillator for generating a second signal having a second frequency;
phase-difference detection means for detecting a first phase difference which is the phase difference between a reception signal and said second signal;
phase-difference setting means for setting a second phase difference between a transmission signal and said first signal; and
calculation means which calculates the distance to the communication counterpart from said first phase difference and said second phase difference.

15. A distance calculation method for calculating a distance to a communication counterpart using a multiband transceiver including means of concurrently performing transmission and reception using two or more different frequencies, the distance calculation method characterized by:
generating a first signal having a first frequency;
generating a second signal having a second frequency;

setting a first phase difference between a transmission signal and said first signal;

detecting a second phase difference which is the phase difference between a reception signal and said second signal; and calculating a distance to a communication counterpart from a third phase difference and a fourth phase difference which are notified by the communication counterpart, and from said first phase difference and said second phase difference, wherein said third phase difference is set to a third signal also having the second frequency by the communication counterpart, and said fourth phase difference is detected between a fourth signal also having the first frequency and said first signal by the communication counterpart.

16. A phase-difference setting method using a multiband transceiver including means of concurrently performing transmission and reception using two or more different frequencies, the phase-difference setting method characterized by comprising:

generating a first frequency;

generating a second frequency;

detecting a second phase difference which is the phase difference between a reception signal and said second frequency; and setting a phase difference between a transmission signal and an output of said first local oscillator as a first phase difference, wherein assuming that the ratio of said first frequency and said second frequency is 1 to m, said phase difference is a value resulting from multiplying said second phase difference by m, or a value resulting from adding a constant to the result of the multiplication by m.

* * * * *